(12) United States Patent
Ichieda

(10) Patent No.: US 9,830,023 B2
(45) Date of Patent: Nov. 28, 2017

(54) IMAGE DISPLAY APPARATUS AND METHOD OF CONTROLLING IMAGE DISPLAY APPARATUS

(71) Applicant: SEIKO EPSON CORPORATION, Tokyo (JP)

(72) Inventor: Hiroyuki Ichieda, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 41 days.

(21) Appl. No.: 14/540,520

(22) Filed: Nov. 13, 2014

(65) Prior Publication Data

US 2015/0145766 A1    May 28, 2015

(30) Foreign Application Priority Data

Nov. 26, 2013 (JP) ................. 2013-243980

(51) Int. Cl.
*G06F 3/042* (2006.01)
*G03B 21/14* (2006.01)

(52) U.S. Cl.
CPC .......... *G06F 3/0425* (2013.01); *G03B 21/14* (2013.01); *G03B 2206/00* (2013.01)

(58) Field of Classification Search
CPC ...... G06F 3/005; G06F 3/04842; G06F 3/017; G06F 3/0425; G06F 3/0426
See application file for complete search history.

(56) References Cited

U.S. PATENT DOCUMENTS

| | | | |
|---|---|---|---|
| 8,118,433 B2 * | 2/2012 | Ishii | G03B 21/00 345/156 |
| 2009/0201420 A1 * | 8/2009 | Brown | H04B 1/205 348/552 |
| 2012/0139827 A1 * | 6/2012 | Li | G06F 3/017 345/156 |
| 2013/0106908 A1 | 5/2013 | Ichieda | |
| 2013/0162607 A1 * | 6/2013 | Ichieda | G06F 3/0425 345/204 |
| 2013/0298029 A1 | 11/2013 | Natori et al. | |
| 2013/0328766 A1 * | 12/2013 | Igarashi | G06F 3/017 345/156 |
| 2015/0317074 A1 | 11/2015 | Natori et al. | |
| 2017/0199581 A1 | 7/2017 | Natori et al. | |

FOREIGN PATENT DOCUMENTS

| | | |
|---|---|---|
| JP | A-2005-141151 | 6/2005 |
| JP | 2013-097177 A | 5/2013 |
| JP | 2013-235318 A | 11/2013 |

* cited by examiner

*Primary Examiner* — Ibrahim Khan
(74) *Attorney, Agent, or Firm* — Oliff PLC

(57) ABSTRACT

A projector includes a projection unit, an external I/F, an image I/F, a connection detecting unit, a manipulation detecting unit, and an instruction information generation unit. The connection detecting unit detects connection in the external I/F and the image I/F. The manipulation detecting unit causes the projection unit to project a detecting image when connection is detected and detects a manipulation performed with respect to the detecting image. The instruction information generation unit executes processing which is based on the detected manipulation.

9 Claims, 6 Drawing Sheets

IMAGE DISPLAY APPARATUS AND METHOD OF CONTROLLING IMAGE DISPLAY APPARATUS

The entire disclosure of Japanese Patent Application No. 2013-243980, filed Nov. 26, 2013 is expressly incorporated by reference herein.

BACKGROUND

1. Technical Field

The present invention relates to an image display apparatus and a method of controlling an image display apparatus.

2. Related Art

In the related art, as an image display apparatus such as a projector, there is a known image display apparatus which detects a manipulation of a user with respect to a screen to execute processing (for example, refer to JP-A-2005-141151). The apparatus disclosed in JP-A-2005-141151 determines the manipulation of a user based on captured image which is the captured screen.

The apparatus disclosed in JP-A-2005-141151 executes image recognition of the captured image to determine the manipulation of a user. In order to promptly determine the manipulation of a user, for example, there is a need to continuously execute processing of the image recognition of captured image. Meanwhile, a load during the processing of the image recognition is not small, and thus, there is a demand for a reduction of the processing load.

SUMMARY

An advantage of some aspects of the invention is to provide an image display apparatus and a method of controlling an image display apparatus in which a manipulation of a user with respect to a screen can be detected, and the processing loads are reduced.

An aspect of the invention is directed to an image display apparatus including a display unit that displays an image, a connection unit that is connected to an external apparatus, a connection detecting unit that detects connection in the connection unit, a manipulation detecting unit that causes the display unit to display a predetermined detecting image when the connection detecting unit detects connection and detects a manipulation performed with respect to the detecting image, and a processing unit that executes processing which is based on a manipulation detected by the manipulation detecting unit.

According to the aspect of the invention, the detecting image can be displayed by the image display apparatus, and a manipulation with respect to the detecting image can be detected to execute the processing. The image display apparatus displays the detecting image when the external apparatus is connected to the connection unit. Therefore, the image display apparatus is in a state of detecting a manipulation when there is a need to detect a manipulation with respect to the detecting image, and thus, for example, the processing for the detection can be stopped when there is no need to detect a manipulation. Accordingly, the processing loads on the image display apparatus which can detect a manipulation can be reduced.

Another aspect of the invention is directed to the image display apparatus of the aspect of the invention described above, wherein the connection unit includes an image input interface, and the manipulation detecting unit causes the display unit to display an image which is based on an input of the image input interface, and causes the display unit to display the predetermined detecting image so as to overlap the image.

According to the aspect of the invention, the image input from the image input interface and the detecting image can be displayed at the same time. Therefore, it is possible to notify a user of a state where a manipulation can be detected.

Still another aspect of the invention is directed to the image display apparatus according to the aspect of the invention described above, wherein the connection unit includes an output interface which outputs control data, and the processing unit outputs control data corresponding to a manipulation detected by the manipulation detecting unit from the output interface when connection in the output interface is detected by the connection detecting unit.

According to the aspect of the invention, the control data corresponding to the detected manipulation can be output to the external apparatus.

Yet another aspect of the invention is directed to the image display apparatus according to the aspect of the invention described above, wherein the processing unit controls an operation of the image display apparatus corresponding to a manipulation detected by the manipulation detecting unit when the connection detecting unit does not detect connection in the output interface but detects connection of the connection unit.

According to the aspect of the invention, when a manipulation is detected, processing can be performed in response whether or not the control data can be output to the external apparatus.

Still yet another aspect of the invention is directed to the image display apparatus according to the aspect of the invention described above, wherein the connection unit includes a storage medium interface connected to a storage medium which stores image data, the manipulation detecting unit causes the display unit to display a user interface corresponding to the processing of the image data stored in the storage medium when the connection detecting unit detects connection in the storage medium interface, and the processing unit performs processing of the image data stored in the storage medium, in response to a manipulation detected by the manipulation detecting unit.

According to the aspect of the invention, when a manipulation is detected, the image data stored in the storage medium can be processed in response to the detected manipulation.

Further another aspect of the invention is directed to the image display apparatus according to the aspect of the invention described above, wherein the image display apparatus is a projector which projects an image onto a projection surface through the display unit, and the manipulation detecting unit detects a manipulation performed with respect to the detecting image, based on a captured image which is the captured projection surface.

According to the aspect of the invention, a manipulation performed with respect to an image which the projector projects to the projection surface can be detected, and a control corresponding to the detected manipulation can be performed.

Still further another aspect of the invention is directed to a method of controlling an image display apparatus which displays an image. The method includes displaying a predetermined detecting image when connection with an external apparatus is detected, detecting a manipulation performed with respect to the detecting image, and executing processing which is based on the detected manipulation.

According to the aspect of the invention, the detecting image can be displayed, and a manipulation with respect to the detecting image can be detected in order to execute the processing. The detecting image is displayed when the external apparatus is connected, and thus, the image display apparatus detects a manipulation when there is a need to detect a manipulation with respect to the detecting image. Therefore, for example, the processing for the detection can be stopped when there is no need to detect a manipulation. Accordingly, the processing loads of the image display apparatus which can detect a manipulation can be reduced.

According to the aspects of the invention, processing loads of an image display apparatus which can detect a manipulation can be reduced.

BRIEF DESCRIPTION OF THE DRAWINGS

The invention will be described with reference to the accompanying drawings, wherein like numbers reference like elements.

DESCRIPTION OF EXEMPLARY EMBODIMENT

Hereinafter, descriptions will be given regarding an embodiment to which the aspects of the invention are applied, with reference to the drawings.

Figure 1:
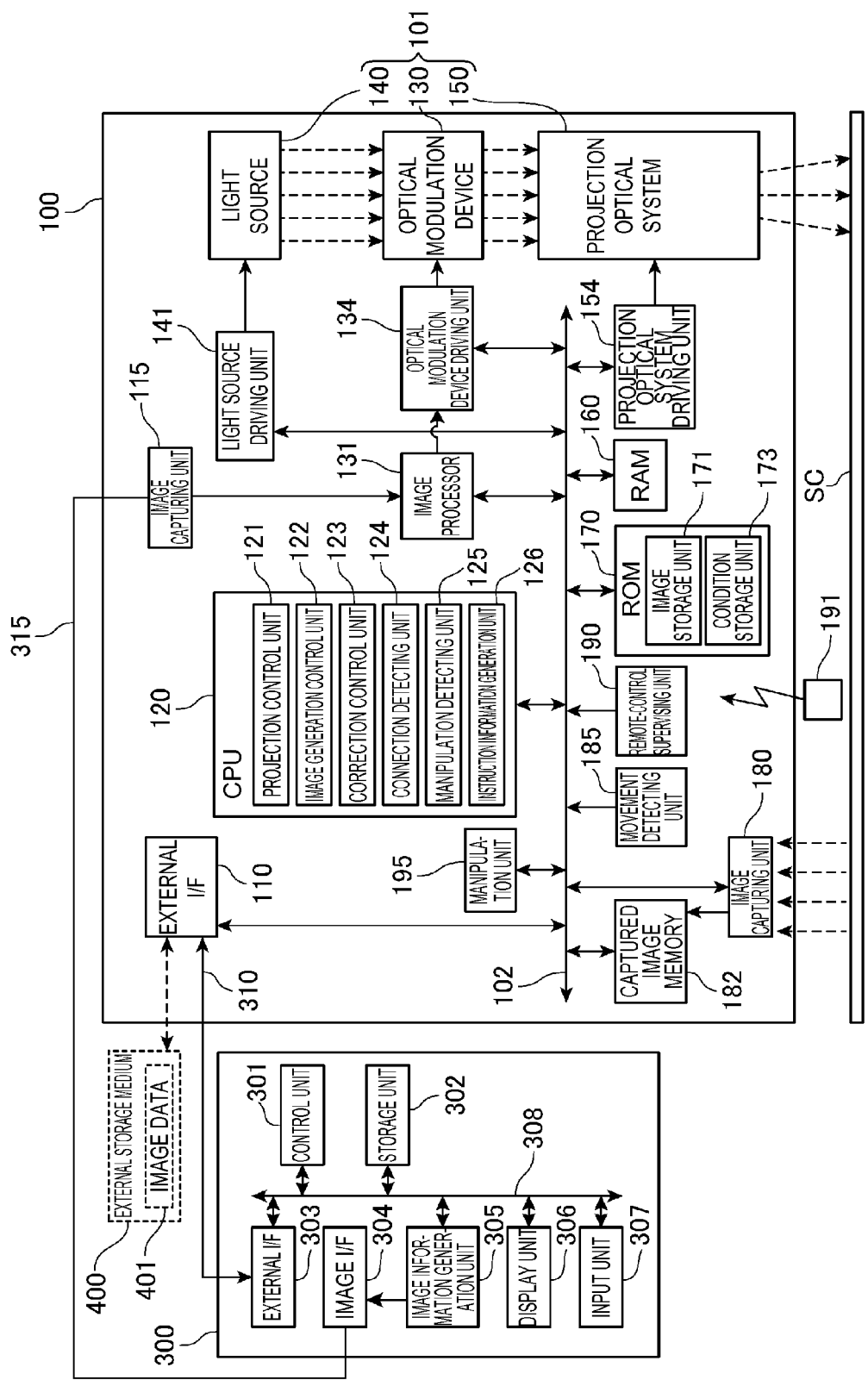
FIG. 1 is a block diagram illustrating a configuration of a projector according to an embodiment.

FIG. 1 is a block diagram illustrating the overall configuration of a projector 100 (an image display apparatus) according to the embodiment. The projector 100 includes an external I/F (interface) 110 and an image I/F (interface) 115, as the interfaces (the connection unit) to which an external apparatus is connected. The external I/F 110 is an interface which inputs and outputs image data and control data. The external I/F 110 is an interface in which data communication can be performed based on various standards. Specifically, a wired interface such as a USB, IEEE 1394, and a wired LAN, and a wireless communication interface such as Bluetooth (registered trademark) and a wireless LAN are included therein. As the external apparatuses, a PC 300 and an external storage medium 400 can be connected to the external I/F 110. In a configuration example of the embodiment, the external I/F 110 has a connector and an interface circuit (not illustrated) which are based on the USB standard, and includes a master USB_A connector and a slave device USB_B connector. In this example, an external I/F 303 of the PC 300 is connected to the USB_B connector of the external I/F 110 via a cable 310. The external storage medium 400 can be connected to the USB_A connector of the external I/F 110. In this case, the USB_A connector functions as a storage medium interface, and the USB_B connector functions as an output interface.

The external I/F 110 and the image I/F 115 correspond to connection units. The external I/F 110 corresponds to the output interface and the storage medium interface, and the image I/F 115 corresponds to an image input interface.

The image I/F 115 (the image input interface) is an interface to which an analog image signal and/or digital image data is input. The image I/F 115 includes a connector wired to the external apparatus and a wireless communication device performing wireless communication between the image I/F 115 and the external apparatus. The image I/F 115 may be connectable to a plurality of apparatuses. In this case, the image signals or the image data of multiple systems are input to the image I/F 115, and then, the image I/F 115 switches an input system in accordance with a control by a CPU 120 described later. When the image I/F 115 is configured to be able to receive the analog image signal, the image I/F 115 may include an A/D (analog/digital) conversion function.

In the embodiment, descriptions will be given exemplifying a configuration in which the image I/F 115 includes a connector to which the digital image data is input so as to be able to receive the digital image data. An image I/F 304 of the PC 300 is wired to the image I/F 115 by an image transmission cable 315.

The projector 100 projects an image onto a screen SC (a projection surface) based on the image data stored in an image storage unit 171, the image data input to the image I/F 115, and the image data stored in the external storage medium 400. The above-described image data may be moving image (video) data or still image data.

The PC (personal computer) 300 includes a control unit 301, a storage unit 302, the external I/F 303, the image I/F 304, an image information generation unit 305, a display unit 306, and an input unit 307. Each of the units is connected to one another through a bus 308. The display unit 306 has a display screen such as a liquid crystal display panel and displays a screen related to data processed by the PC 300. The input unit 307 includes input devices such as a keyboard, a mouse, a trackball, a digitizer, and a touch panel.

The control unit 301 includes a CPU, a RAM, and a ROM (not illustrated). The CPU executes a program stored in the storage unit 302 so as to execute an operating system of the PC 300, thereby controlling the PC 300. The control unit 301 executes various application programs which are operated in the operating system.

The storage unit 302 stores the program which the CPU of the control unit 301 executes, and data which is processed by the control unit 301, in a non-volatile manner.

The external I/F (interface) 303 includes a connector and the interface circuit which are connected to the external apparatus, and the wireless communication interface so as to cause data to be input from and output to the external apparatus. The external I/F 303 of the embodiment includes the USB_A connector allowing the USB slave device to be connected thereto. In this case, the PC 300 functions as the USB master device. The CPU of the control unit 301 executes a device driver program which controls a device connected to the external I/F 303, thereby performing controlling of an operation of the device and processing of data input from the device. For example, an input device treated as a human interface device (HID) in Windows (registered trademark) operating system can be connected to the external I/F 303. When the input device is connected to the external I/F 303, the control unit 301 performs processing on data input from the external I/F 303 as manipulation data in the input device.

The image I/F (interface) 304 includes a connector which outputs the digital image data. The image I/F 304 transmits the image data generated by the image information generation unit 305 to an apparatus which is connected via a cable.

The image information generation unit 305 generates display data screen showing data processed by the control unit 301, and a processing result so as to be displayed on the display screen of the display unit 306. In order to cause the screen displayed on the display unit 306 to be displayed on the projector 100, the image information generation unit 305 generates the image data corresponding to the display data of the screen so as to be output from the image I/F 304. Therefore, when the PC 300 is connected to the projector 100, the display screen of the display unit 306, and the screen SC display the same screens. The image I/F 304 and the image information generation unit 305 may be allowed to output the analog image signal.

The external storage medium 400 includes a non-volatile semiconductor memory element such as a flash memory, and the interface circuit, thereby storing data. The external storage medium 400 can be connected to USB interfaces of the projector 100 or the PC 300 and is recognized as a slave device of USB mass storage class by the devices. In the embodiment, descriptions will be given regarding a case where the external storage medium 400 storing image data 401 is connected to the external I/F 110. The image data 401 has a data form which can be processed by the projector 100.

The embodiment shows an example in which the projector 100 projects an image from a front surface to the screen SC (the projection surface) which includes a reflecting curtain. The screen SC is substantially vertical, and a screen surface thereof has a rectangular shape. A wall surface, a ceiling surface, or a floor surface of a building may be utilized as the projection surface. The screen SC may include a transparent type curtain so as to allow the projector 100 to project an image from the rear surface of the screen SC.

The projector 100 includes a projection unit 101 (a display unit) forming an optical image.

The projection unit 101 is configured to have a light source 140, an optical modulation device 130, and a projection optical system 150. As the light source 140, a xenon lamp, an extra-high pressure mercury lamp, a light emitting diode (LED), and a laser light source can be used. The projection unit 101 may include a reflector guiding light emitted by the light source 140 to the optical modulation device 130, or a light modulation unit (not illustrated) which reduces intensity of the light emitted by the light source 140.

The optical modulation device 130 modulates the light emitted by the light source 140, thereby generating image light. The optical modulation device 130 can employ a method which adopts three transparent type liquid crystal light bulbs corresponding to each color of RGB. In this case, light emitted by the light source 140 is separated into rays of light in each color of RGB by a dichroic mirror, thereby being incident on the optical modulation device 130. Then, the rays of light in each color are modulated by three liquid crystal panels included in the optical modulation device 130, and the modulated rays of light are synthesized by a cross dichroic prism. The optical modulation device 130 is driven by an optical modulation device driving unit 134 and changes the transmittance of light in each pixel arranged in a matrix shape, thereby forming an image.

The projection optical system 150 has a lens group which includes a zoom lens performing magnification/reduction of an image to be projected and a focus adjustment, and the projection optical system 150 also has a mechanism which drives the lenses to adjust the zoom and focus thereof. The projection optical system 150 projects light modulated by the optical modulation device 130 on the screen SC, and thus, a projection image is formed on the screen SC.

The body of the projector 100 includes an image processing system which controls an operation of the projector 100 and performs electrical processing with respect to the image signal. The image processing system includes a CPU 120, an image processor 131, a RAM 160 and a ROM 170. The CPU 120 executes a program stored in the ROM 170, thereby realizing a control function and an image processing function. The RAM 160 forms a work area which temporarily stores the program and data which the CPU 120 and the image processor 131 execute. The image processor 131 may include a work area necessary when executing processing such as the adjusting of a display state of the image which the image processor 131 performs as an internal RAM. The ROM 170 stores a program which the CPU 120 executes and data processed by the program which the CPU 120 executes, in a non-volatile manner. The ROM 170 includes the image storage unit 171 and a condition storage unit 173.

The optical modulation device driving unit 134, a light source driving unit 141, a projection optical system driving unit 154, an image capturing unit 180, a captured image memory 182, a movement detecting unit 185, a remote-control supervising unit 190, a remote control 191, and a manipulation unit 195 are included in the image processing system of the projector 100. Each of the above-described units configuring the image processing system is connected to one another by a bus 102.

The image I/F 115 is connected to the image processor 131 so that the image data input to the image I/F 115 is input to the image processor 131. When the image I/F 115 allows a plurality of image supply apparatuses to be connected thereto, the image I/F 115 switches an input system for the image data in accordance with a control by the CPU 120, thereby outputting the image data to the image processor 131.

The CPU 120 includes a projection control unit 121, an image generation control unit 122, a correction control unit 123, a connection detecting unit 124, a manipulation detecting unit 125, and an instruction information generation unit 126 (a processing unit). Each of the units is realized when the CPU 120 executes the program stored in the ROM 170. The function of each unit of the CPU 120 will be described later.

The image processor 131 executes processing to cause another image to overlap and performs correcting of trapezoidal distortion with respect to the image data input from the image I/F 115 in accordance with a control by the CPU 120. The image processor 131 generates the image signal based on the processed image data and outputs the generated image signal to the optical modulation device driving unit 134. When the projector 100 projects the image data stored in the image storage unit 171, the image processor 131 performs the above-described processing with respect to the image data. As the image processor 131, a general processor which is commercially available as a digital signal processor (DSP) for correcting trapezoidal distortion or processing an image can be adopted, or a dedicated ASIC can be adopted as well.

While correcting the trapezoidal distortion, based on a correction parameter input from the CPU 120, the image processor 131 corrects an image for one frame which is rendered based on the image data to be input or the image data already input from the image I/F 115.

The image processor 131 causes the image stored in the image storage unit 171 to overlap with an image rendered based on the image data to be input from the image I/F 115 as an OSD image in accordance with a control of the CPU 120, thereby synthesizing the images into one image. The overlapped image, for example, is a menu screen for manipulating the projector 100.

The image processor 131 may adjust the display state of an image including brightness, contrast, depth of color, and the tone of color with respect to the image data input from the image I/F 115.

The optical modulation device driving unit 134 drives the optical modulation device 130 based on the image signal input from the image processor 131. Accordingly, the image which is based on the image data input to the image I/F 115 is formed in an image forming region of the optical modulation device 130. The image formed in the optical modulation device 130 is formed on the screen SC as a projection image via the projection optical system 150.

The light source driving unit 141 applies a voltage to the light source 140 and turns ON and OFF the light source 140 in response to an instruction signal input from the CPU 120.

The projection optical system driving unit 154 operates a mechanism of the projection optical system 150 in accordance with a control of the CPU 120, thereby adjusting the zoom and focus thereof. The zoom and focus may be manually adjusted. In this case, the projection optical system driving unit 154 is no longer necessary.

The image capturing unit 180 includes a known image sensor (for example, a CCD), a lens, a control circuit which reads out an image signal of the image sensor, executes imaging in accordance with a control of the CPU 120, and outputs captured image data to a captured image memory 182. The image capturing unit 180 performs imaging in a direction in which the front surface of the projector 100, that is, the projection optical system 150 projects an image toward the screen SC. The imaging direction and an angle of view of the image capturing unit 180 are set so as to allow the entire projection image projected on the screen SC at a recommended projection distance to be within at least an image capturing range.

The captured image data of the image capturing unit 180 is recorded in a predetermined region of the captured image memory 182. The captured image memory 182 sequentially inverts flags in a predetermined region after completing writing the image data for one screen. Therefore, the CPU 120 can know whether or not image capturing by the image capturing unit 180 is completed by referring to the flags. The CPU 120, referring to the flags, accesses to the captured image memory 182, thereby acquiring the necessary captured image data.

The movement detecting unit 185 includes a gyro sensor or an acceleration sensor for detecting a movement of the body of the projector 100, thereby outputting the detected value to the CPU 120. A threshold value is set for the detected value of the movement detecting unit 185 in advance. Therefore, when a movement exceeding the threshold value is detected by the movement detecting unit 185, the CPU 120 determines that the projector 100 has moved. The CPU 120 determines that the projector 100 has stopped when a movement detected by the movement detecting unit 185 is equal to or lower than the threshold value and this state continues exceeding the standby time set in advance.

When a threshold value is set for the movement detecting unit 185 and a detected value of the movement detecting unit 185 exceeds the threshold value, and when a detected value of the movement detecting unit 185 is equal to or lower than the threshold value so as to exceed the standby time, the movement detecting unit 185 may output the detected signal to the CPU 120. In this case, processing loads on the CPU 120 can be reduced.

The movement detecting unit 185 may detect a movement based on a change in a captured image of the image capturing unit 180. In this case, the movement detecting unit 185 acquires the captured image data from the captured image memory 182 and compares the acquired captured image data with captured image data which has imaged at a different time, thereby detecting the movement when a difference between the captured image data items exceeds a predetermined value. In this case, the movement can be detected by utilizing the image capturing unit 180.

The remote-control supervising unit 190 receives a radio signal transmitted from the remote control 191 outside the projector 100. The remote control 191 includes a manipulandum (not illustrated) which is manipulated by a user and transmits a manipulation signal as a radio signal such as an infrared signal in response to a manipulation with respect to the manipulandum. The remote-control supervising unit 190 includes a reception unit (not illustrated) which receives the infrared signal or the like. The remote-control supervising unit 190 receives and analyzes a signal transmitted from the remote control 191, and generates a signal instructing contents of a manipulation of a user, thereby outputting the signal to the CPU 120.

The manipulation unit 195 is configured to have a manipulandum (not illustrated) of a manipulation panel which is arranged in the body of the projector 100, for example. When a manipulation with respect to manipulandum is detected, the manipulation unit 195 outputs a manipulation signal corresponding to the manipulandum to the CPU 120.

The projection control unit 121 included in the CPU 120 controls an operation of projecting an image based on the image data input to the image I/F 115. The projection control unit 121 controls the light source 140 to be turned ON and OFF by the light source driving unit 141 in response to powering ON and OFF the projector 100, and controls the image processor 131 to perform processing with respect to the image data input to the image I/F 115.

The correction control unit 123 acquires the captured image data from the captured image memory 182 and analyzes the shape of the captured image data, thereby calculating a parameter for correcting distortion of a projection image. Here, the correction control unit 123 may project a correction pattern (not illustrated) which is stored in the ROM 170 to the screen SC by controlling using the projection control unit 121. In this case, the correction control unit 123 extracts the correction pattern from the captured image data of the image capturing unit 180 and analyzes the shape of the correction pattern, thereby calculating the parameter. The correction control unit 123 outputs the calculated parameter to the image processor 131 and corrects the trapezoidal distortion in accordance with the parameter.

The connection detecting unit 124 detects connection when an external apparatus is connected to the external I/F 110, and the image I/F 115. The connection detecting unit 124 detects connection when equipment is connected to the external I/F 110, thereby transceiver the control data with respect to the connected instrument. Here, the connection detecting unit 124 determines the type and properties of the connected instrument, determining whether or not the equipment can be connected, and initializing necessary for data communication. For example, when an external apparatus is connected to a USB connector included in the external I/F 110, the connection detecting unit 124 detects connection based on a change in a resistance value between a power-supply pin (Vbus) of the USB connector and a GND pin. For example, in a case where the external I/F 110 includes an RS-232C connector, and equipment is connected to the RS-232C connector, the connection detecting unit 124 detects connection when a signal is input to the RS-232C connector.

In other words, in a case where the connector of the external I/F 110 has specifications capable of detecting connection without transceiving the control signal, the connection detecting unit 124 detects connection when a cable is connected thereto. In a case of the specifications capable of detecting connection when the connector of the external I/F 110 transceiver the control signal, the connection detecting unit 124 detects connection upon the conditions of reception of the control signal. The connection detecting unit 124 may be configured to transceive the control data with respect to the connected instrument, thereby detecting connection when a negotiation necessary for data communication and initialization of communication are completed.

The connection detecting unit 124 detects connection in the external I/F 110 even when the external I/F 110 includes the wireless communication interface. In this case, the connection detecting unit 124 may detect connection when equipment capable of wireless communication is detected. However, it is preferable to detect connection when a necessary negotiation and initialization of communication are completed after practically transceiving the control data with respect to the external apparatus.

When equipment is connected to the image I/F 115, the connection detecting unit 124 detects connection of the equipment similarly to the external I/F 110. In a case where an interface to which the image I/F 115 inputs an analog image signal is included, the connection detecting unit 124 detects connection when a signal is input to the image I/F 115. In this case, the connection detecting unit 124 may determine whether or not the input signal is a format signal which can be processed by the projector 100, thereby detecting connection when determined to be the signal which can be processed.

When an interface to which the image I/F 115 inputs digital image data is included, and when the wireless communication interface is included, the connection detecting unit 124 performs the detection similarly to the external I/F 110. Specifically, when the image I/F 115 has specifications capable of detecting connection without transceiving a control signal, the connection detecting unit 124 detects connection when a cable is connected to the image I/F 115. The connection detecting unit 124 may detect connection when data is input to the image I/F 115. The connection detecting unit 124 may detect connection when the image I/F 115 transceiver the control data with respect to the external apparatus, and the negotiation necessary for data communication and the initialization of communication are completed.

In the embodiment, as an example, the external I/F 303 of the PC 300, and the external storage medium 400 can be connected to the external I/F 110. The image I/F 304 of the PC 300 can be connected to the image I/F 115.

Data to set equipment which can be connected via the external I/F 110 may be stored in the ROM 170 in advance. In this case, the connection detecting unit 124 may detect connection when equipment which is set by the data to be able to be connected is connected to the external I/F 110 or the image I/F 115. In other words, when equipment which is not the equipment set in advance to be able to be connected is connected to the external I/F 110 or the image I/F 115, the connection detecting unit 124 may operate not to detect connection.

The manipulation detecting unit 125 executes manipulation detection processing and detects a position indicating manipulation which is performed by using an indicator on the screen SC. The position indicating manipulation is a manipulation in which the indicator points to and indicates a position within an angle of view of the image capturing unit 180 during an operation of the projector 100. The indicator is not specifically limited in form as long as the indicator is shown in the captured image data of the image capturing unit 180 and can discriminate a projection image of the projector 100. For example, the indicator may be a rod-shaped handheld device for a user, or may be a tool having another shape. The device or the tool may or may not have a function of emitting light or a function of transmitting a radio signal. A portion (for example, the hand or the finger) of body of a user may be the indicator. The indicator may be a luminescent spot formed on the screen SC by causing a light emitting apparatus (not illustrated) such as a laser pointer to irradiate the screen SC with light.

The manipulation detecting unit 125 detects that the position indicating manipulation based on the captured image data stored in the captured image memory 182 has occurred. In the embodiment, the manipulation detecting unit 125 reads out the image data of a detecting image 63 (FIGS. 2A to 2E) stored in the image storage unit 171 and displays the image data so as to overlap the image projected by the image processor 131. The manipulation detecting unit 125 detects a manipulation of the indicator when a manipulation causing the indicator to overlap the detecting image 63 is detected based on the captured image data of the captured image memory 182. The manipulation detecting unit 125 outputs data indicating that a manipulation of the indicator has been detected.

The manipulation detecting unit 125 may specify a position indicated by the indicator and output data indicating coordinates of the indicated position through the manipulation detection processing.

The manipulation detecting unit 125 not only detects the manipulation position indicated by the position indicating manipulation through the manipulation detection processing but also can determine whether or not the detected position matches the conditions set in advance. The manipulation detecting unit 125 also can determine whether or not a trace of the detected position matches the conditions set in advance. Here, the trace of the position denotes a figure formed by connecting the indicated positions of the position indicating manipulation which are detected by the manipulation detecting unit 125 through multiple times of detection with time intervals. The conditions by which the manipulation detecting unit 125 performs determination are stored in the condition storage unit 173 of the ROM 170. In the condition storage unit 173, the conditions by which the manipulation detecting unit 125 performs determination are set to correspond to processing which is executed when a manipulation which matches the conditions is detected. The manipulation detecting unit 125 may output data indicating that a manipulation of the indicator is detected and data indicating conditions applied to the detected manipulation.

The instruction information generation unit 126 executes processing corresponding to the manipulation of the indicator when a manipulation of the indicator is detected by the manipulation detecting unit 125. The processing which can be executed by the instruction information generation unit 126 is not particularly limited. However, three types of processing can be executed in the embodiment.

First processing is instruction information output processing which is executed when the PC 300 is connected to the external I/F 110 and the image I/F 115. In the instruction information output processing, the instruction information generation unit 126 generates the manipulation data indicating a manipulation of the indicator, thereby outputting the manipulation data from the external I/F 110. The manipulation data has a format of the manipulation data output by the input device which is connected to the PC 300, for example. Therefore, the PC 300 can perform processing of the manipulation data output by the projector 100 as the manipulation data input from the input device such as a mouse, a tablet, a digitizer, a trackball, and a keyboard. The input device is, for example, a device which is treated as the HID in Windows (registered trademark) operating system. The instruction information generation unit 126 may output data indicating a manipulation of the indicator from the external I/F 110 in a form different from the manipulation data corresponding to the HID.

Second processing is internal event generation processing which is executed when the PC 300 or another image supply apparatus is connected to the image I/F 115 and an external apparatus is not connected to the external I/F 110. In the internal event generation processing, the instruction information generation unit 126 executes processing (an internal event) set in advance regarding control of the projector 100. As the processing executed by the instruction information generation unit 126, processing which can be executed by a manipulation of the remote control 191 can be exemplified such as input source switching, mute processing, pausing of a projection image, and un-pausing. In the input source switching, the input system of the image signal or the image data input to the image I/F 115 is switched. In the mute processing, the images rendered by the optical modulation device 130 are caused to be entirely black so as to stop the projection of images. Here, the output of audio may be stopped. The pausing of a projection image is the processing to stop an image during the projection of moving image, and an input image in pause is stored in a buffer memory (not illustrated) included in the image processor 131, and reproduction of the moving image is restarted in accordance with an instruction of restart. The contents and the types of the internal events executed by the instruction information generation unit 126 are not limited as long as the projector 100 can execute the internal event without utilizing the external apparatus.

The second processing may change a projection position of a projection image projected on the screen SC. In other words, the processing may change a position where an image is rendered through a liquid crystal light bulb of the optical modulation device 130. The second processing may magnify and reduce a projection image. In this case, processing in which an image to be rendered through a liquid crystal light bulb of the optical modulation device 130 is magnified and reduced, or processing in which the projection optical system 150 executes the zoom so as to magnify and reduce a projection image is executed. In such processing, a magnification ratio to magnify an image and a reduction ratio to reduce an image may be set in advance and stored in the ROM 170. In this case, every time the manipulation of the indicator is detected, the projection image is magnified or reduced by the magnification ratio or the reduction ratio set in advance.

Through the internal event generation processing, the instruction information generation unit 126 may cause the image corresponding to the manipulation detected by the manipulation detecting unit 125 to overlap the input image, using the image processor 131. In this case, the instruction information generation unit 126 may read out the image data from the image storage unit 171 and display the image data. When there are multiple types of manipulations of the indicator detected by the manipulation detecting unit 125, and multiple images are stored in the image storage unit 171, the instruction information generation unit 126 may select an image corresponding to the type of a manipulation and read out the image from the image storage unit 171. The instruction information generation unit 126 may read out an image corresponding to the condition of the manipulation detected by the manipulation detecting unit 125. The instruction information generation unit 126 may render lines or figures based on coordinates of a manipulation position of the indicator detected by the manipulation detecting unit 125.

The third processing is executed as storage medium management processing when a storage device (for example, the external storage medium 400) having the image data stored therein is connected to the external I/F 110. The instruction information generation unit 126 can execute the storage medium management processing even though the PC 300 or other image supply apparatuses are connected to the image I/F 115. In this case, the instruction information generation unit 126 may select data or a signal which is set in advance, among the image signal or image data input to the image I/F 115, and the image data stored in the external storage medium 400 connected to the external I/F 110.

Through the storage medium management processing, the manipulation detecting unit 125 causes a user interface related to displaying of the image data stored in the external storage medium 400 to be projected to the screen SC. In other words, the manipulation detecting unit 125 reads out the image data of a manipulation menu stored in the image storage unit 171, thereby causing the image data to overlap the projected image by the image processor 131. Accordingly, the screen SC displays icons and the like of the manipulation menu of the image data. For example, the manipulation menu includes a thumbnail list of the image data inside the external storage medium 400 and includes icons to instruct switching of the thumbnail list, selecting of the image data by a thumbnail, starting and ending of projection of the selected image data, switching of the image data, and starting and ending of a slide show displaying the automatically switched image data. Here, the manipulation detecting unit 125 detects a manipulation of the indicator with respect to the manipulation menu which is displayed on the screen SC. The manipulation detecting unit 125 outputs data specifying the manipulated icon when a manipulation is detected. The instruction information generation unit 126 reads out the image data stored in the external storage medium 400 in accordance with the data output by the manipulation detecting unit 125, and performs processing matching the manipulation detected by the manipulation detecting unit 125.

Operations executed by the instruction information generation unit 126 through the storage medium management processing may be configured as one application program. In this case, the instruction information generation unit 126 executes the application program based on a connection state detected by the connection detecting unit 124 and the data output by the manipulation detecting unit 125.

Here, descriptions will be given regarding an operation of the manipulation detecting unit 125 detecting a manipulation.

FIGS. 2A to 2E are diagrams illustrating operational examples respectively corresponding to the position indicating manipulations.

Figure 2A:
FIGS. 2A to 2E are diagrams illustrating operational examples respectively corresponding to position indicating manipulations.

FIG. 2A illustrates a state where no external apparatus is connected to the image I/F 115 and the external I/F 110. In this case, the screen SC displays a control image 61. The control image 61 includes a message indicating that there is no image input. The image data of the control image 61 is stored in the image storage unit 171.

Figure 2B:
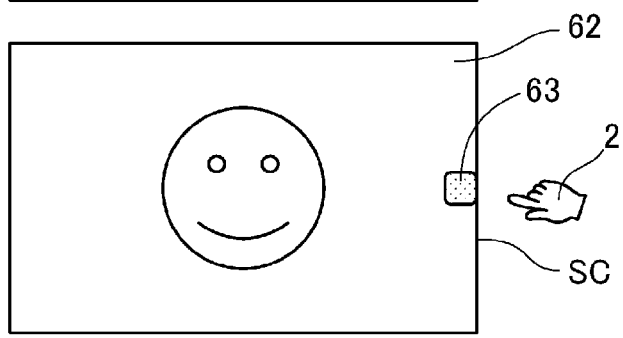

When an external apparatus is connected to the image I/F 115, and the connection detecting unit 124 detects the connection thereof, as illustrated in FIG. 2B, the projection control unit 121 causes a projection image 62 which is based on the image data input to the image I/F 115 to be projected. The manipulation detecting unit 125 is triggered to start a detecting operation to detect the position indicating manipulation of an indicator 2 by the connection detecting unit 124 which has detected the connection. Through the detecting operation thereof, the manipulation detecting unit 125 controls the image processor 131 to cause the detecting image 63 to be overlappingly projected on the projection image 62. The detecting image 63 is arranged at an end portion of the screen SC so as to be less likely to obstruct objects in the projection image 62 and to be likely to be manipulated. In the example of FIG. 2B, the detecting image 63 has a substantially rectangular shape in a size set in advance.

The manipulation detecting unit 125 specifies a position and a size of the detecting image 63 on a captured image. For example, the manipulation detecting unit 125 acquires the position and the size of the detecting image 63 on a panel (an image forming region of the optical modulation device 130) by reading out the data from the ROM 170 and calculating the data. For example, data indicating the position and the size when the detecting image 63 overlaps the input image, or data indicating the position and the size of the detecting image 63 on the panel may be stored in the ROM 170 together with the image data of the detecting image 63.

Then, the manipulation detecting unit 125 deduces the position and the size of the detecting image 63 on the captured image from the position and the size of the detecting image 63 on the panel based on a result and the like of calibration processing performed in advance. Otherwise, the position of the detecting image 63 on the captured image can be specified by obtaining a difference between the captured images before and after displaying the detecting image 63, or can be specified by performing pattern matching.

The manipulation detecting unit 125 sets a range overlapping the detecting image 63 as a detection region. The manipulation detecting unit 125 specifies the indicated position of the indicator based on the captured image data by the image capturing unit 180. When the indicated position is within the detection region, the manipulation detecting unit 125 determines that a specific manipulation has been performed. FIGS. 2A to 2E exemplify cases in which the hand of a user is used as the indicator 2.

Figure 2C:
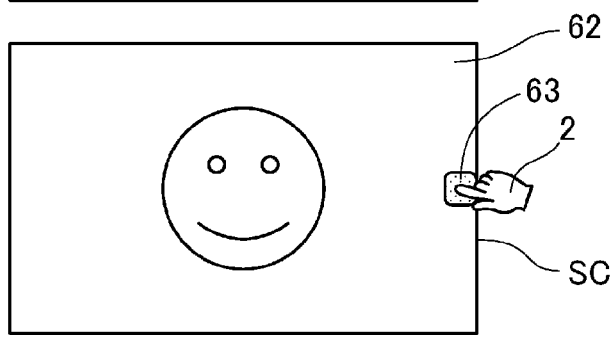

When the detecting image 63 is in a state of being projected, and the indicator 2 overlaps the detecting image 63 as illustrated in FIG. 2C, the manipulation detecting unit 125 determines that the indicator 2 has overlapped the detecting image 63, based on the captured image data by the image capturing unit 180. When the indicator 2 overlaps the detecting image 63, light projected by the projection unit 101 is obstructed by the indicator 2 in front of the screen SC. Therefore, in the captured image data by the image capturing unit 180, brightness, color, appearance, and the like of the detecting image 63 change at a portion overlapped by the indicator 2. The manipulation detecting unit 125 extracts and analyzes the image of the detecting image 63, that is, the image of the detection region from the captured image data, and detects the change in brightness and color, thereby determining the presence or absence of a manipulation of the indicator 2. The manipulation detecting unit 125 may extract and analyze only the detecting image 63 (the detection region) and the image around thereof from the captured image data. In this case, the processing loads can be reduced by decreasing a data amount to be processed by the manipulation detecting unit 125.

Conditions of determining the presence or absence of a manipulation with respect to the detecting image 63 by the manipulation detecting unit 125 can be exemplified as follows.

The manipulation detecting unit 125 determines the presence of a manipulation when the indicator 2 is present on the detecting image 63 (the detection region) for equal to or longer than the period set in advance. Specifically, the manipulation detecting unit 125 determines the presence of a manipulation when any one of the following expressions (1) and (2) continues for equal to or longer than the period set in advance, with respect to at least a portion of pixels within the detection region in the captured image data.

$$\text{luminance value of pixel} > \text{first threshold value} \quad (1)$$

$$\text{luminance value of pixel} < \text{second threshold value} \quad (2)$$

The manipulation detecting unit 125 may detect the change of the image shape of the detecting image 63 by extracting the image of the detecting image 63 from the captured image data and comparing the extracted image and the image of the detecting image 63 in the captured image data when not manipulated. In this case, the manipulation detecting unit 125 determines the presence of a manipulation when the shape change of the detecting image 63 is carried out for a predetermined period.

The manipulation detecting unit 125 may determine the presence or absence of a manipulation with respect to the detecting image 63 by extracting the image of the indicator 2 from the captured image data and comparing the position of the image of the indicator 2 and the position of the detecting image 63.

The conditions, the first and second threshold values necessary for determining the conditions, and the data related to the position, size, shape, and the like of the detecting image 63 are set in advance and stored in the condition storage unit 173.

The manipulation detecting unit 125 may have a condition that at least a portion of the detecting image 63 is present in the captured image data when performing the above-described determination. In this case, for example, it is possible to discriminate a hidden state of the detecting image 63 due to a user or another person standing near the image capturing unit 180 or near the detecting image 63 from a manipulation by the indicator 2. Therefore, the manipulation is detected when the detecting image 63 is intentionally manipulated by the indicator 2, and thus, the detection of an unintended erroneous manipulation can be prevented.

As illustrated in FIG. 2C, when the manipulation detecting unit 125 has detected a manipulation of the indicator 2, the instruction information generation unit 126 executes any one of the instruction information output processing, the internal event generation processing, and the storage medium management processing. Here, an example will be described regarding a case where the internal event generation processing is executed and an input source is switched. The instruction information generation unit 126 switches the input system of the image I/F 115, and thus, the projection image on the screen SC is switched as illustrated in FIG. 2D.

Figure 2D:
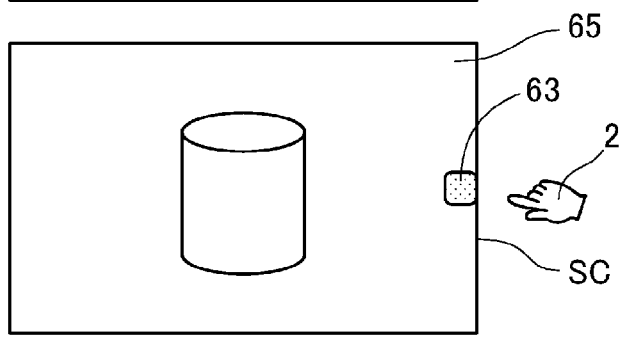

Even after the input source is switched as illustrated in FIG. 2D, the manipulation detecting unit 125 continues the manipulation detection processing. The screen SC displays the detecting image 63, thereby making it possible to detect the manipulation by the indicator 2.

Figure 2E:

Thereafter, when inputs of images with respect to the image I/F 115 stop, or external equipment is detached from the image I/F 115 so that the connection detecting unit 124 no longer detects connection, the manipulation detecting unit 125 stops the manipulation detection processing. In this case, as illustrated in FIG. 2E, projection of the detecting image 63 stops. Since no image is input to the image I/F 115, the control image 61 is projected on the screen SC.

Figure 3:
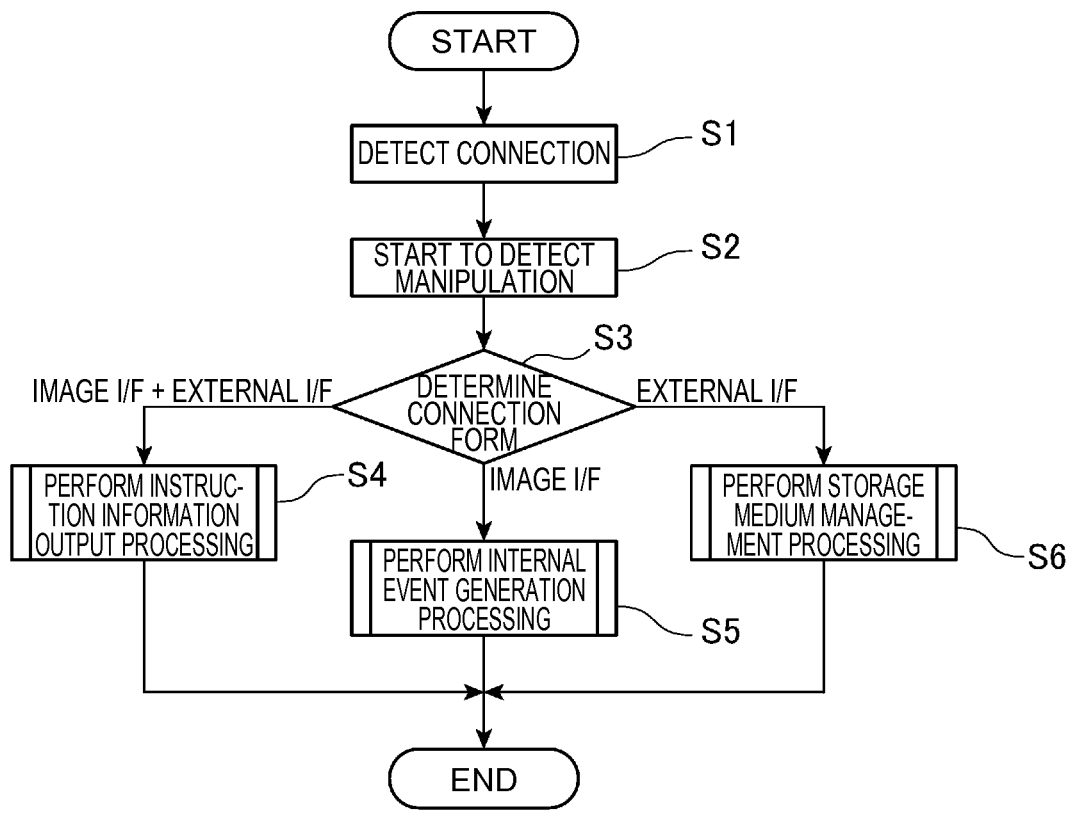
FIG. 3 is a flow chart illustrating an operation of the projector.

FIG. 3 is a flow chart illustrating an operation of the projector 100.

When the CPU 120 detects connection with respect to the external I/F 110 or the image I/F 115 through the connection detecting unit 124 (Step S1), the manipulation detecting unit 125 starts to detect a manipulation (Step S2), and the instruction information generation unit 126 determines a connection form (Step S3). The manipulation detecting unit 125 and the instruction information generation unit 126 are summoned by the connection detecting unit 124 to start the operation, for example.

In Step S3, when the connection detecting unit 124 detects connection in both the external I/F 110 and the image I/F 115, the instruction information generation unit 126 executes the instruction information output processing corresponding to the external I/F 110 and the image I/F 115 (Step S4). When the connection detecting unit 124 detects connection in the image I/F 115, the instruction information generation unit 126 executes the internal event generation processing corresponding to the connection in the image I/F 115 (Step S5). When the connection detecting unit 124 detects the connection of the external I/F 110, the instruction information generation unit 126 executes the storage medium management processing corresponding to the connection in the external I/F 110 (Step S6).

Figure 4:
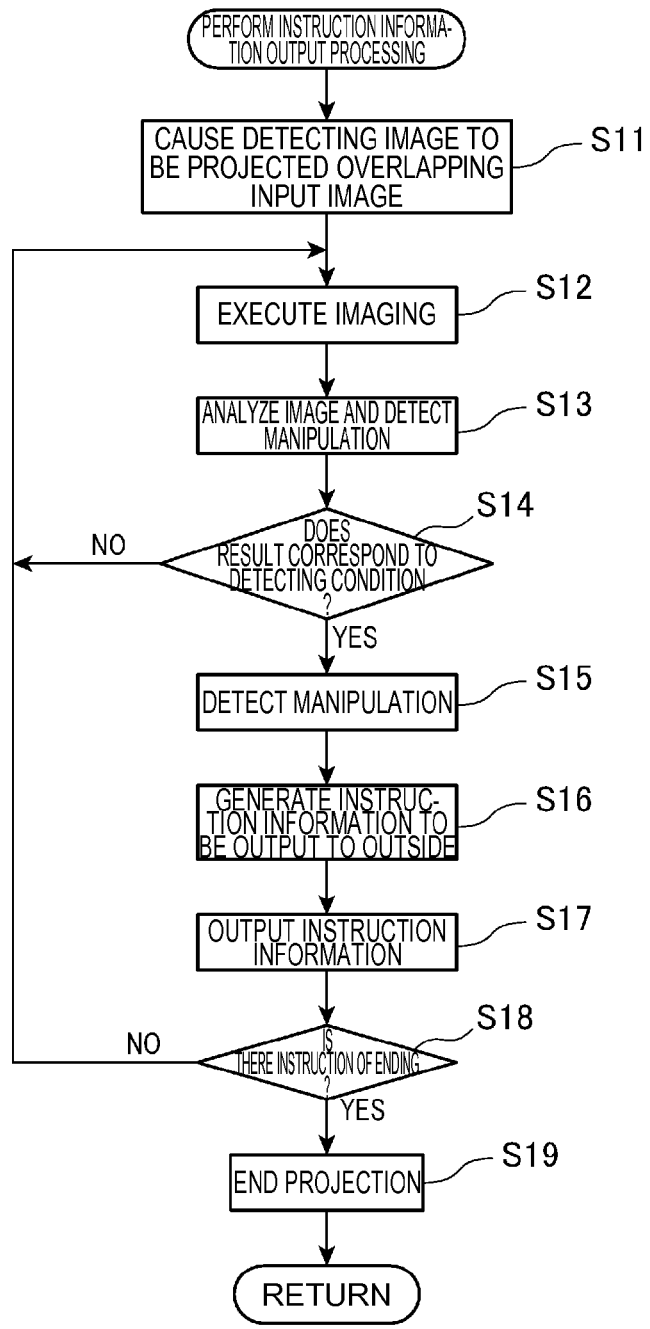
FIG. 4 is a flow chart illustrating instruction information output processing in detail.

FIG. 4 is a flow chart illustrating the instruction information output processing in detail.

Through the instruction information output processing, the projection control unit 121 causes an image which is based on the image data input to the image I/F 115 to be projected on the screen SC.

The manipulation detecting unit 125 causes the image processor 131 to execute processing based on the image data of the detecting image (for example, the detecting image 63 in FIG. 2B) which is stored in the image storage unit 171, thereby causing the detecting image to be projected overlapping the input image (Step S11). Here, imaging is executed by the image capturing unit 180, and thus, the captured image data is stored in the captured image memory 182 (Step S12). The manipulation detecting unit 125 acquires and analyzes the captured image data stored in the captured image memory 182, thereby detecting the position of the indicator 2 or a manipulation of the indicator 2 with respect to the detecting image 63 (Step S13).

Depending on the result of analyzing in Step S13, the manipulation detecting unit 125 determines whether or not a manipulation corresponding to the condition stored in the condition storage unit 173 is performed (Step S14). When no manipulation corresponding to the condition is performed (No in Step S14), the manipulation detecting unit 125 causes the processing to return to Step S12. When a manipulation corresponding to the condition is performed (Yes in Step S14), the manipulation detecting unit 125 outputs data indicating that a manipulation is detected (Step S15).

The instruction information generation unit 126 generates instruction information to be output to the outside, based on data output by the manipulation detecting unit 125, in response to the detection of a manipulation by the manipulation detecting unit 125 (Step S16), thereby outputting the instruction information from the external I/F 110 (Step S17). The instruction information which is generated and output by the instruction information generation unit 126 is manipulation data of the input device corresponding to the HID.

Here, the manipulation detecting unit 125 determines whether or not ending of the operation of projector 100 is instructed by the manipulation unit 195 or the remote control 191 (Step S18). When ending is instructed (Yes in Step S18), the manipulation detecting unit 125 causes projection to stop and the main processing to end (Step S19). When ending is not instructed (No in Step S18), the manipulation detecting unit 125 causes the processing to return to Step S12 and the manipulation detection processing to proceed.

Figure 5:
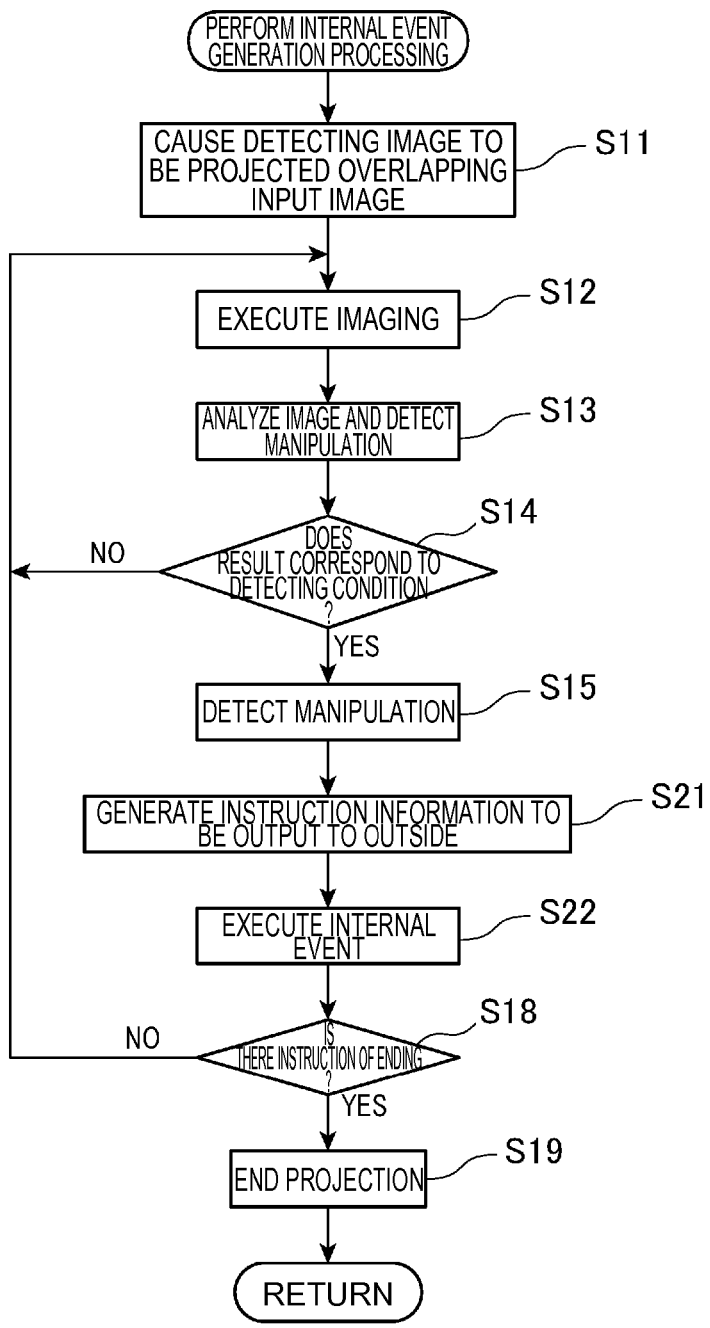
FIG. 5 is a flow chart illustrating internal event generation processing in detail.

FIG. 5 is a flow chart illustrating the internal event generation processing in detail.

Through the internal event generation processing, the projection control unit 121 causes an image which is based on the image data input to the image I/F 115 to be projected on the screen SC. The operations in Steps S11 to S15 are as described with reference to FIG. 4.

The instruction information generation unit 126, in response to the detection of a manipulation by the manipulation detecting unit 125, generates an internal event of the projector 100 (Step S21), and executes the internal event (Step S22). Thereafter, the manipulation detecting unit 125 determines whether or not ending of the operation of the projector 100 is instructed (Step S18). The manipulation detecting unit 125 causes the projection to stop and the main processing to end when ending is instructed (Step S19). When ending is not instructed, the manipulation detecting unit 125 causes the processing to return to Step S12 and the manipulation detection processing to proceed.

Figure 6:
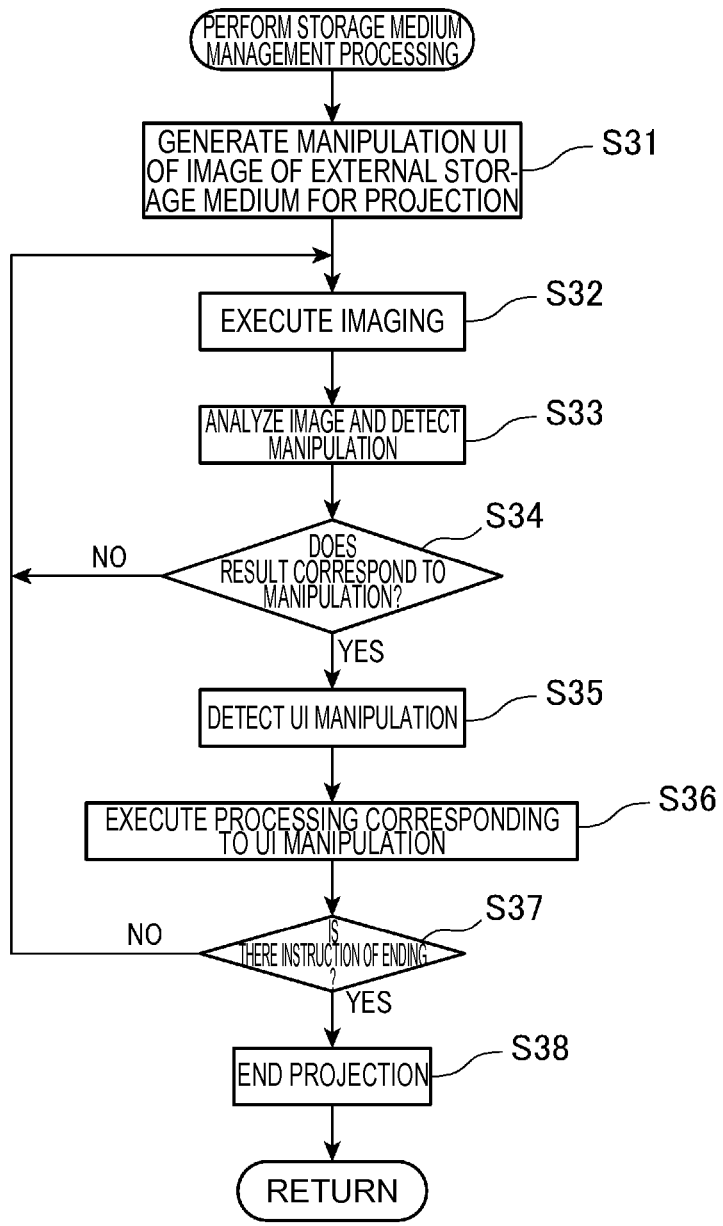
FIG. 6 is a flow chart illustrating storage medium management processing in detail.

FIG. 6 is a flow chart illustrating the storage medium management processing in detail.

Through the storage medium management processing, the manipulation detecting unit 125 acquires the image data of the user interface stored in the image storage unit 171, thereby causing the screen SC to display the manipulation menu of the image data (Step S31).

Subsequently, imaging is executed by the image capturing unit 180, and thus, the captured image data is stored in the captured image memory 182 (Step S32). The manipulation detecting unit 125 acquires and analyzes the captured image data stored in the captured image memory 182, thereby detecting a manipulation of the indicator 2 with respect to the manipulation menu of the screen SC (Step S33).

Depending on the result of analyzing in Step S33, the manipulation detecting unit 125 determines whether or not the position or the operation of the indicator 2 corresponds to the manipulation with respect to the manipulation menu (Step S34). When not corresponding thereto (No in Step S34), the manipulation detecting unit 125 causes the processing to return to Step S32. When corresponding thereto (Yes in Step S34), the manipulation detecting unit 125 outputs data indicating that a manipulation with respect to the manipulation menu is detected (Step S35).

The instruction information generation unit 126 executes processing with respect to the image data 401 in response to a manipulation detected by the manipulation detecting unit 125 (Step S36). For example, the instruction information generation unit 126 reads out and displays the image data 401. When multiple items of the image data 401 are stored, the instruction information generation unit 126 executes switching and displaying the image data 401, or magnifying and reducing the image data 401.

For example, the following processing can be exemplified as the processing executed in Step S36.

- A thumbnail image of the image data 401 is generated to perform displaying of a page of the thumbnail list. In a state of displaying the page of the thumbnail list, in response to the manipulation detected by the manipulation detecting unit 125, switching (returning of the thumbnail list to the previous page and forwarding of the thumbnail list to the next page) of the page of the thumbnail list is performed.
- In a state where the page of the thumbnail list is displayed, on account of a movement of a cursor, selecting of a thumbnail from the displayed the thumbnail list is performed. Reading out and displaying of the image data 401 corresponding to the selected thumbnail is performed.
- Switching of the displayed image to another image of the image data 401 is performed (switching to the previous image or switching to the next image among the multiple images included in the image data 401).
- Changing, magnifying, reducing, and rotating of the display position of the displayed image are performed. In other words, every time the manipulation detecting unit 125 detects a manipulation, moving of the display position in accordance with the amount and the direction set in advance, magnifying and reducing of an image by the magnification ratio and the reduction ratio set in advance, and rotating an image in accordance with the rotational direction and the rotation amount set in advance are performed.

The manipulation detecting unit 125 determines whether or not ending of the operation of the projector 100 is instructed by the manipulation unit 195 or the remote control 191 (Step S37). When ending is instructed (Yes in Step S37), the manipulation detecting unit 125 causes the projection to stop and the main processing to end (Step S38). When ending is not instructed (No in Step S37), the manipulation detecting unit 125 causes the processing to return to Step S32 and the manipulation detection processing to proceed.

As described above, the projector 100 includes the projection unit 101, the external I/F 110, the image I/F 115, the connection detecting unit 124, the manipulation detecting unit 125, and the instruction information generation unit 126. The connection detecting unit 124 detects connection in the external I/F 110 and the image I/F 115. The manipulation detecting unit 125 causes the detecting image to be projected when connection is detected, and detects a manipulation performed with respect to the detecting image. The instruction information generation unit 126 executes processing which is based on the detected manipulation. Accordingly, the detecting image can be displayed by the projector 100 and the processing can be executed by detecting a manipulation with respect to the detecting image. Since the projector 100 displays the detecting image when an external apparatus is connected to the external I/F 110 or the image I/F 115, the projector 100 can stop the processing for the detection when there is no need to detect a manipulation, for example. Therefore, it is possible to reduce the processing loads of the projector 100 which can detect a manipulation.

The manipulation detecting unit 125 causes the projection unit 101 to display an image which is based on the image data input to the image I/F 115, and causes the projection unit 101 to display a predetermined detecting image overlapping the image. Accordingly, the image input from the image I/F 115 and the detecting image can be displayed at the same time. Therefore, it is possible to notify a user of a state where a manipulation can be detected.

When connection in the external I/F 110 is detected by the connection detecting unit 124, the instruction information generation unit 126 outputs the control data corresponding to a manipulation detected by the manipulation detecting unit 125 from the external I/F 110. Accordingly, the control data corresponding to the detected manipulation can be output to the external apparatus.

When connection in the external I/F 110 is not detected but connection in the image I/F 115 is detected by the connection detecting unit 124, the instruction information generation unit 126 generates and executes an internal event of the projector 100 corresponding to a manipulation detected by the manipulation detecting unit 125. In this manner, when a manipulation is detected, the projector 100 can perform processing in response to a state whether or not the control data can be output to an external apparatus.

The external storage medium 400 can be connected to the external I/F 110. When connection of the external storage medium 400 is detected, the manipulation detecting unit 125 causes the projection unit 101 to display the user interface corresponding to a manipulation of the image data 401. Then, the instruction information generation unit 126 performs processing of the image data 401 in response to a manipulation with respect to the user interface detected by the manipulation detecting unit 125. Accordingly, the image data 401 stored in the external storage medium 400 in response to a manipulation of the indicator 2 can be processed.

The embodiment described above is merely an example of a specific aspect to which the invention is applied, without limiting the invention. The invention can be applied to other aspects different from the embodiment described above. In the above-described embodiment, as an example, descriptions has been given regarding a configuration in which the manipulation detecting unit 125 determines the presence of a manipulation by the indicator 2 and predetermined processing is executed when brightness of the detecting image 63 in the captured image data changes. In other words, the example describes that predetermined processing is executed when the indicator 2 overlaps the detecting image 63. However, the invention is not limited thereto. The manipulation detecting unit 125 may determine the presence of a manipulation by the indicator 2 when brightness of the detecting image 63 in the captured image data changes and restored. In other words, the invention may be configured such that the predetermined processing is executed when the indicator 2 overlapping the detecting image 63 on the screen SC is away from the detecting image 63.

For example, the external I/F 110 may be configured to include a USB and a wired LAN interface so as to input and output (to transmit and receive) both of the image data and the control data through one cable with respect to the image supply apparatus connected to the external I/F 110. In this case, multiple signal lines included in the cable may be divided into an image data signal line and a control data signal line. Otherwise, the image data and the control data may be input and output using a common signal line. In this case, the external I/F 110 functions as the output interface and the image input interface. Moreover in this case, the external I/F 110 may be configured to also function as the image I/F 115.

For example, when a plurality of image supply apparatuses are connected to the external I/F 110 or the image I/F 115, the above-described first processing to third processing may be switched in accordance with switching of the input system. The switching of the input system may be automatically performed. In other words, when the image supply apparatus is connected to the external I/F 110 or the image I/F 115, the input system may be switched to the connected image supply apparatus. The input system may be switched in accordance with a manipulation of the remote control 191 or the manipulation unit 195.

A table in which another type of the image supply apparatus corresponds to the processing (specific contents of the processing) to be executed may be stored in a ROM, thereby switching the processing with reference to the table when the image supply apparatus is connected or switched. In this case, when the image supply apparatus is connected to the external I/F 110 or the image I/F 115, or the switching of the input system is detected, processing is switched to the processing set in the table to correspond to another type of the image supply apparatus.

In the embodiment, descriptions have been given regarding a configuration in which the projection unit 101 and the image capturing unit 180 are fixed to the body of the projector 100. However, the projection unit 101 and the image capturing unit 180 can be configured as bodies separate from the body of the projector 100. In the embodiment, descriptions have been given exemplifying the configuration in which three transparent type liquid crystal panels corresponding to each color of RGB are adopted as the optical modulation device. However, a reflection-type liquid crystal panel may be adopted. Moreover, for example, the optical modulation device may be configured by a method in which one liquid crystal panel and a color wheel are combined, a method in which three digital mirror devices (DMD) modulating colored light of each color of RGB are adopted, and a method in which one digital mirror device and the color wheel are combined.

Each of the functioning units illustrated in FIG. 1 is to describe the functional configuration of the projector 100. Therefore, the specific implementation is not particularly limited. In other words, each of the functioning units is not necessarily implemented in corresponding hardware. It is naturally possible to have a configuration in which the functions of the multiple functioning units are realized by causing one processor to execute the program. In the embodiment, a portion of the function realized in software may be realized in hardware. In contrast, a portion of the function realized in hardware may be realized in software.

What is claimed is:

1. An image display apparatus comprising:
   a display that displays an image;
   an interface circuit that is connected to an external apparatus;
   a connection detecting unit, implemented by a computer processor, that detects connection in the interface circuit;
   a manipulation detecting unit including an image capturing sensor, implemented by the computer processor, that:
   (i) starts to detect a manipulation when the connection detecting unit detects the connection in the interface circuit,
   (ii) causes the display to display a predetermined detecting image in response to detection of the connection in the interface circuit by the connection detecting unit,
   (iii) detects a manipulation performed with respect to the detecting image based on the detecting image captured by the image capturing sensor, and
   (iv) stops detecting the manipulation when the connection detecting unit no longer detects the connection in the interface circuit; and
   a processing unit, implemented by the computer processor, that executes processing which is based on a manipulation detected by the manipulation detecting unit.

2. The image display apparatus according to claim 1, wherein the interface circuit includes an image input interface, and
   wherein the manipulation detecting unit causes:
   the display to display an image which is based on an input of the image input interface, and
   the display unit to display the predetermined detecting image so as to overlap the image.

3. The image display apparatus according to claim 1, wherein the interface circuit includes an output interface which outputs control data, and
   wherein the processing unit outputs control data corresponding to a manipulation detected by the manipulation detecting unit from the output interface when connection in the output interface is detected by the connection detecting unit.

4. The image display apparatus according to claim 3, wherein the processing unit controls an operation of the image display apparatus corresponding to a manipulation detected by the manipulation detecting unit when the connection detecting unit does not detect connection in the output interface but detects connection of the interface circuit.

5. The image display apparatus according to claim 1, wherein the interface circuit includes a storage medium interface connected to a storage medium which stores image data,
   wherein the manipulation detecting unit causes the display to display a user interface corresponding to the processing of the image data stored in the storage medium when the connection detecting unit detects connection in the storage medium interface, and
   wherein the processing unit performs processing of the image data stored in the storage medium, in response to a manipulation detected by the manipulation detecting unit.

6. The image display apparatus according to claim 1, wherein the image display apparatus is a projector which projects an image onto a projection surface through the display, and
   wherein the manipulation detecting unit detects a manipulation performed with respect to the detecting image, based on a captured image which is the captured projection surface.

7. The image display apparatus according to claim 1, wherein the manipulation detecting unit further detects a manipulation performed with respect to the detecting image based on the detecting image captured by the image capturing sensor by detecting a change in brightness of the captured detecting image.

8. The image display apparatus according to claim 1, wherein the manipulation detecting unit further causes the display to stop displaying the detecting image in response to no detection of the connection in the interface circuit by the connection detecting unit.

9. A method of controlling an image display apparatus which displays an image, the method uses a controller that is implemented by a processor to perform:
   displaying a predetermined detecting image in response to detection of a connection with an external apparatus;
   detecting a manipulation performed with respect to the detecting image based on the detecting image captured by an image capturing sensor, wherein starting to detect a manipulation when the connection detecting unit detects the connection in the interface circuit, causing the display to display a predetermined detecting image in response to detection of the connection in the interface circuit by the connection detecting unit, detecting a manipulation performed with respect to the detecting image based on the detecting image captured by the image capturing sensor, and stopping detecting the manipulation when the connection detecting unit no longer detects the connection in the interface circuit; and
   executing processing which is based on the detected manipulation.

* * * * *